United States Patent [19]

Mueller

[11] 4,098,742

[45] Jul. 4, 1978

[54] FLUORINE AND SILICONE CONTAINING POLYMERS

[75] Inventor: Karl Friedrich Mueller, New York, N.Y.

[73] Assignee: Ciba-Geigy Corporation, Ardsley, N.Y.

[21] Appl. No.: 762,061

[22] Filed: Jan. 24, 1977

[51] Int. Cl.$^2$ .................. C08G 77/04; C08L 75/04; C08J 3/06
[52] U.S. Cl. .................. 260/29.2 M; 260/824 R; 428/911; 428/142; 428/321; 428/351; 428/391; 528/28; 528/29; 528/70
[58] Field of Search ........ 260/46.5 E, 824 R, 29.2 M; 428/321, 351, DIG. 911, 142, 391

[56] References Cited

U.S. PATENT DOCUMENTS

| 3,179,622 | 4/1965 | Haluska | 260/46.5 E |
| 3,246,048 | 4/1966 | Haluska | 260/29.2 M |
| 3,562,352 | 2/1971 | Nyilas | 260/824 R |
| 3,808,249 | 4/1974 | Koshar | 260/46.5 E |
| 3,809,783 | 5/1974 | Pittman et al. | 260/46.5 E |

*Primary Examiner*—V. P. Hoke
*Attorney, Agent, or Firm*—Edward McC. Roberts; Michael W. Glynn; Prabodh I. Almaula

[57] ABSTRACT

Polyurethanes which contain at least one segment derived from a perfluoroalkyl-substituted diol and at least one segment derived from a reactive-hydrogen-containing polysiloxane, which are synthesized by co-polycondensation with an organic diisocyanate.

These polyurethanes are useful as coatings on glass, ceramics, masonry, wood, paper, metal, leather and especially textiles, to which they impart a high degree of oil and water repellency.

21 Claims, No Drawings

FLUORINE AND SILICONE CONTAINING POLYMERS

This invention is directed to certain polyurethanes which are useful as coatings on glass, ceramics, masonry, wood, paper, metal, leather and especially textiles. The polyurethanes of this invention impart a high degree of oil and water repellency to the treated substrate.

The polyurethanes of this invention contain at least one segment derived from a perfluoroalkyl substituted diol and at least one segment derived from a polysiloxane. The polysiloxanes, useful in preparing the polysiloxane segments of the polyurethanes of this invention, contain reactive hydrogen atoms as hydroxyl, amino or sulfhydryl hydrogen atoms.

The polyurethanes of this invention are prepared by co-polycondensation of a selected perfluoroalkyl-substituted diol and a selected polysiloxane with an organic diisocyanate. The hydrophilicity of the polyurethanes of this invention can be modified by the further inclusion of an optical hydrophilic segment derived from a polyol, polyamine or polythiol which can be included in the co-polycondensation with the organic diisocyanate.

PRIOR ART

Fluorine containing polymers have been extensively used to make oil and water repellent coatings on various substrates, primarily on textiles.

Polyaddition polymers as well as polycondensates have been prepared for this purpose. The perfluoroalkyl groups of these polymers impart such low free surface energies to coated surfaces that not only water, but also organic liquids are unable to wet them. Heptane, for instance, with a surface tension of 17 [dynes/cm] will not wet a coating with a surface energy lower than that; surfaces consisting of more or less densely packed perfluoroalkyl groups have free surface energies between 10 and 15 [dynes/cm]. Only very small amounts of fluorine are needed to prepared such surfaces. Therefore, perfluoroalkyl group-containing textile finishes have, despite their greater material cost, replaced to a great extent silicone based water repellents for textile applications.

Silicone based water repellents have up to the arrival of fluoro-chemicals dominated the market for water repellents for textiles. They are still used in applications, where only water repellency, no oil repellency, is important and where the exceptionally smooth hand they impart is desired.

Attempts to combine both types of finishes in one application with the goal to get high oil and water repellency together with a soft, smooth hand, have failed, because of the inherent incompatibility of $R_f$-substituted polymers and polysilicones in combination textiles finishes. In such combinations of the art, the oil repellency of the fluoro-polymer was lost or seriously diminished by combination with polysilicones.

The combination of siloxane units and fluorine in one molecule for textile applications has been described in U.S. Pat. No. 3,331,813, with the structure being:

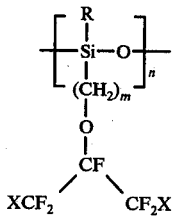

wherein X is halogen, R is hydrogen or alkyl, $m$ is 2 or 3 and $n$ is an integer from 10–50.

Similar structures are described in German Patent No. 2,062,816:

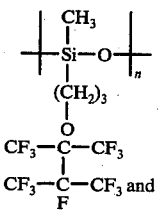

U.S. Pat. No. 3,903,128:

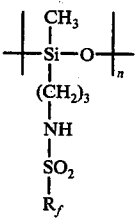

In these cases, Si and F are combined in one monomeric unit and fluoroalkyl groups are attached directly to a polysiloxane backbone, covering up in effect the Si atoms. As a result, neither oil repellency nor water repellency is optimized.

GENERAL DESCRIPTION

It has now been found that if certain perfluoroalkyl group-containing units and polysiloxane units are combined as shown below, as separate segments, in one polymeric chain, a finish posessing both, the oil repellency of the $R_f$-segment, and the water repellency and softness of the siloxane segment is obtained. In addition, it has further been found, very unexpectedly, that polysiloxane compounds are ideal for internally extending and thus modifying $R_f$-polyurethanes prepared from ($R_f$)-diols and diisocyanates, from the viewpoint of solubility and dispersibility of the polymer in water.

The polymer structure is a linear combination of $R_f$-segments and siloxane segments including bis-urethane linking groups, formed by a diisocyanate, of the structure

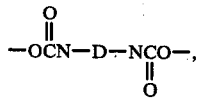

where D is an organic bridging group such as alkylene or cycloalkylene, phenylene or naphthylene.

Another segment which shall be called the hydrophilic segment and which may or may not be present, is derived from a tertiary amino group or polyalkyleneoxide units containing diol or diamine. 5–60% of the total weight of the polymer is the $R_f$-segment, 40–95% of the siloxane segment, and 0–50% of the hydrophilic segment. The preferred weight ranges of the different segments in the polyurethane polymer are: $R_f$-segment, 20–40%; siloxane segment, 50–70%; and hydrophilic segment, 1–10%.

The polymer segments are of the following structures:

$R_f$-segment:

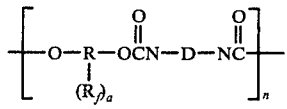
(I)

Siloxane segments

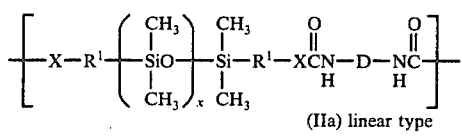
(IIa) linear type

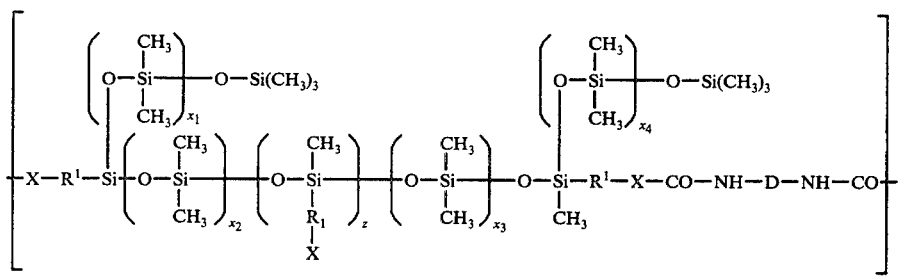
(IIb) comb type

Hydrophilic segment (optional)

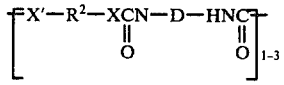
(III)

In these structures:
  $R_f$ is perfluoroalkyl of 4 to 18 carbon atoms or a perfluoroalkoxyperfluoroalkyl of 4 to 24 carbon atoms,
  D is a diradical residue of an organic diisocyanate,
  R is the diradical residue of a perfluoroalkyl substituted diol,
  $n$ is 1 to 5,
  $a$ is 1 or 2,
  $x_1$, $x_2$, $x_3$ and $x_4$ are independently of each other 1 to 40 with $x_1 + x_2 + x_3 + x_4 = 5$ to 75,
  $z$ is 0 to 1,
  $R^1$ is alkylene of 3 to 5 carbon atoms or a polyalkoxy chain of 1 to 15 alkoxy units of 2 or 3 carbon atoms each,
  X is oxygen or sulfur or NH,
  X' is oxygen or NH,
  $x$ is 5 to 50, and
  $R^2$ is a diradical moiety of either a tertiary-amino-group-containing diol or diamine, or of a polyalkylene-oxide-containing diol or diamine, or of a carboxy-substituted diol or diamine.

The $R_f$-Segment I is synthesized from a $R_f$-diol of the following structure:

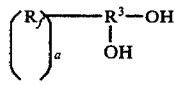

where
  $a$ is 1 or 2,
  $R_f$ is a linear or branched perfluoroalkyl group of 4 to 18 carbon atoms or a perfluoroalkoxy perfluoroalkyl group of 4 to 24 carbon atoms, and
  $R_3$ is a branched or straight chain bridging group selected from alkylene of 1 to 12 carbon atoms, alkylene thioalkylene of 2 to 12 carbon atoms, alkylene polyoxyalkylene of 4 to 80 carbon atoms and 1 to 40 oxygen atoms, alkylene-iminoalkylene of 1 to 12 carbon atoms where the nitrogen atom contains as a third substituent hydrogen or an alkyl or hydroxyl-alkyl group of 1 to 6 carbon atoms.

Particularly useful $R_f$-diols of the structure $(R_f)_a$—$R^3$—$(OH)_2$ are:

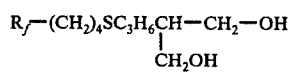
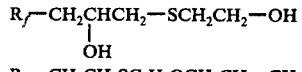
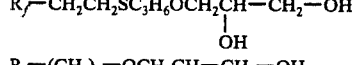
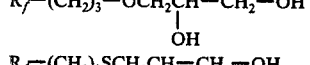
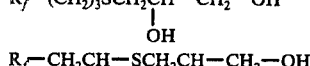
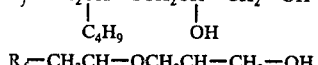
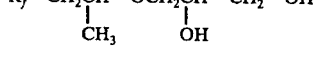

-continued

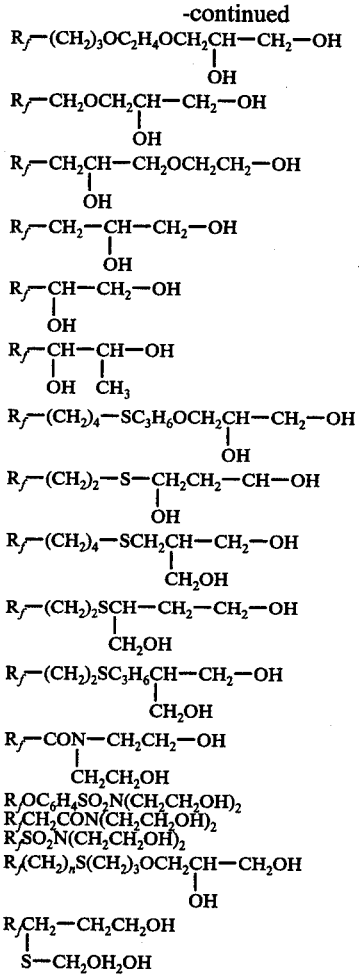

Preferred as $R_f$-diols of structures

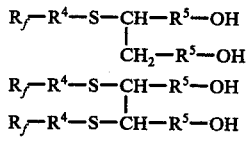

In the above structures,
$R_f$ is a linear or branched perfluoroalkyl group of 4 to 18 carbon atoms or a perfluoroalkoxy perfluoroalkyl group of 4 to 24 carbon atoms,
$R^4$ is a branched or straight chain alkylene of 1 to 12 carbon atoms, alkylenethio-alkylene of 2 to 12 carbon atoms, alkylene-oxyalkylene of 2 to 12 carbon atoms, or alkylene iminoalkylene of 2 to 12 carbon atoms, where the nitrogen atom contains as a third substituent hydrogen, or alkyl of 1 to 6 carbon atoms,
$R^5$ is a straight or branched chain alkylene of 1 to 12 carbon atoms or an alkylene-propoxyalkylene of formula $C_mH_{2m}(OC_kH_{2k})_r$ 

wherein
$m$ is 1 to 12,
$k$ is 2 to 6, and
$r$ is 1 to 40.

A particularly preferred class of perfluoroalkyl substituted compounds are $R_f$-glycols of the structure:

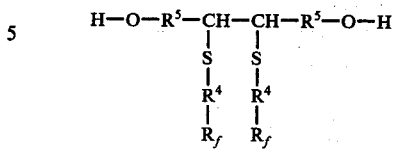

wherein
$R_f$ is perfluoroalkyl of 6 to 12 carbon atoms,
$R^4$ is $-CH_2CH_2-$, and
$R^5$ is $-CH_2-$.

These diols are synthesized by addition of 2 mols of $R_fR^4SH$ to 1 mol of butyne-diol in the presence of an azo type free radical catalyst such as azobisisobutylnitrile at a temperature of 60° to 80° C, in buld or in the presence of a $C_6-C_{10}$ alkane solvent.

A preferred class of mercaptans ($R_fR^4SH$) is disclosed in U.S. Pat. No. 3,544,663 and can be obtained by reacting a perfluoroalkyl alkylidide with thiourea, followed by hydrolysis.

Preferred are the compounds of this invention which contain the residue on an $R_f$-glycol, where:
$R_f$ is perfluoroalkyl of 6 to 12 carbon atoms,
$R^4$ is ethylene, and
$R^5$ is methylene,
which is obtained by adding perfluoroalkyl-ethyl-mercaptan to 2-butyn-1,4-diol To make the $R_f$-segment, the $R_f$-diol is reacted with a diisocyanate to form a perfluoroalkyl substituted polyurethane prepolymer; suitable diisocyanates are:

1,2-ethylene diisocyanate;
1,6-hexylene diisocyanate;
lysine diisocyanate;
bis(2-isocyanatoethyl) fumarate;
1,4-cyclohexylene diisocyanate;
methylcyclohexylene diisocyanate;
2,2,4-(or 2,4,4-)trimethyl-1,6-hexylene diisocyanate;
2,6-toluene diisocyanate;
4,4'-diisocyanatodiphenyl ether;
4,4'-diisocyanatodiphenylmethane;
3,3'-dichloro-4,4'-diisocyanatodiphenylmethane;
4,4'-diphenyl diisocyanate;
4,4'-diisocyanatodibenzyl;
3,3'-dimethyl-4,4'-diisocyanatodiphenyl;
2,2'-dimethyl-4,4'-diisocyanatodiphenyl;
3,3'-dimethoxy-4,4'-diisocyanatodiphenyl;
2,2'-dichloro-5,5'-dimethoxy-4,4'-diisocyanatodiphenyl;
3,3'-dichloro-4,4'-diisocyanatodiphenyl;
1,3-diisocyanatobenzene;
1,4-diisocyanatobenzene;
1,2-naphthylene diisocyanate;
4-chloro-1,2-naphthylene diisocyanate;
4-methyl-1,2-naphthylene diisocyanate;
1,3-naphthylene diisocyanate;
1,4-naphthylene diisocyanate;
1,5-naphthylene diisocyanate;
1,6-naphthylene diisocyanate;
1,7-naphthylene diisocyanate;
1,8-naphthylene diisocyanate;
4-chloro-1,8-naphthylene diisocyanate;
2,3-naphthylene diisocyanate;
2,7-naphthylene diisocyanate;
1,8-dinitro-2,7-naphthylene diisocyanate;

1-methyl-2,4-naphthylene diisocyanate;
1-methyl-5,7-naphthylene diisocyanate;
6-methyl-1,3-naphthylene diisocyanate;
7-methyl-1,3-naphthylene diisocyanate;
Dimer Acid diisocyanate (DDI, General Mills); and
3-isocyanatomethyl-3,5,5-trimethylcyclohexyl-isocyanate.

The Siloxane Segment (II) is synthesized by reaction of a diisocyanate from the above list with a polysiloxane diol, triol, di-thiol or polyamine which can be of two different structures, namely:

wherein
R$^1$ is an alkylene group of 3 to 5 carbon atoms, a polyalkoxy chain with 1 to 15 lower alkoxy units or a lower alkylene-NH-lower alkylene group,
$x$ is 5 to 75,
$x_1 + x_2 + x_3 + x_4 = 5$ to 75,
$z$ is 0 or 1, and
X is —O—, —NH—, or —S—.

The reactive moiety is attached to the silicone polymer via a non-hydrolyzable Si-C bond. Typical examples are:

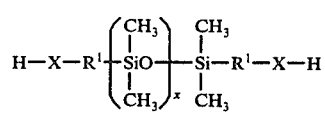

IIa
linear type

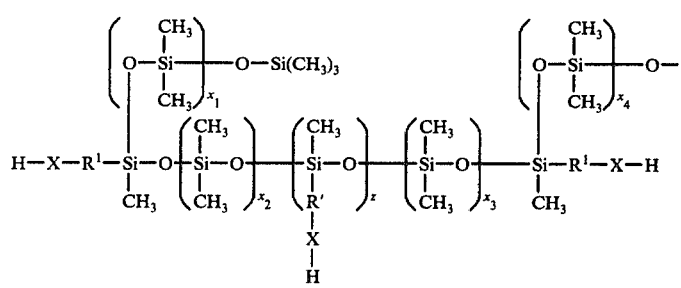

IIb
comb type

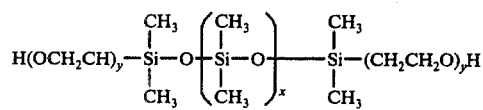

Dow Corning
Q4-3667 fluid
$y + y' = 26$
$x = 10$

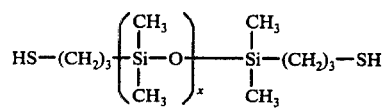

Dow Corning
X2-8024
$x \approx 37$

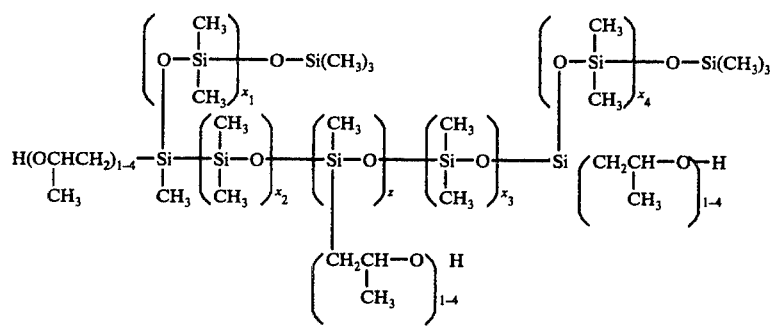

Dow Corning 1248 fluid:
$x_1 + x_2 + x_3 + x_4 = 65$ to 75
$z = 1$
Dow Corning Q4-3557:
$x_1 + x_2 + x_3 + x_4 = 6$ to 8
$z = 0$ -continued

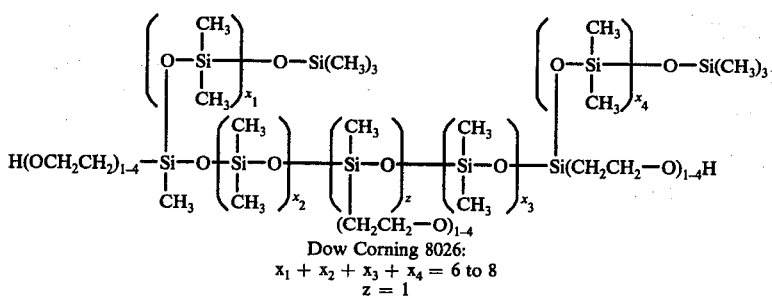
Dow Corning 8026:
$x_1 + x_2 + x_3 + x_4 = 6$ to $8$
$z = 1$

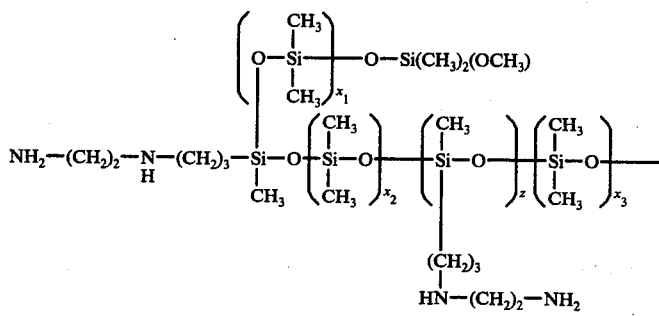

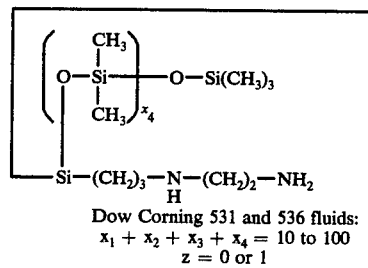
Dow Corning 531 and 536 fluids:
$x_1 + x_2 + x_3 + x_4 = 10$ to $100$
$z = 0$ or $1$ In each of the above siloxane structures where Dow-Corning tradenames are given, the exact silocane structure is not know, but the indicated Dow-Corning fluids can be readily used for the purposes here disclosed.

The hydrophilic segment (III), which is not a necessary constituent of the novel polyurethanes, can be either nonionic, cationic or anionic. If it is nonionic, it is synthesized from polyethylene oxide diols of molecular weights from 200 to 2000, or the bis-(2-aminopropyl)ethers of such polyethylene oxide diols. Such bis-aminopropyl ethers are available from Jefferson Chemical Corp. under the tradename Jeffamine ED.

Eligible cationic hydrophilic segments are derived from diols or diamines, which contain at least one tertiary amino group in the molecule; typical examples include:

N-methyl diethanol amine
N,N-bis(2-hydroxypropyl)aniline
N-methyl-di(3-aminopropyl)amine
1,4-bis(3-aminopropyl)piperazine
3-(4-pyridyl)pentane 4,5-diol
N-hydroxyethyl-4-propanol piperidine Eligible anionic hydrophilic segments are introduced into the chain by carboxy diols or diamines, such as bis-hydroxy-methyl propionic acid.

In each case, the hydrophilic segment, whether nonionic, cationic or anionic, is synthesized by reaction of the selected diol or diamine, with a diisocyanates set out above as suitable for making the perfluoroalkyl segments and the polysiloxane segments.

SYNTHESIS

Synthesis of the novel $R_f$-polysiloxane-polyurethanes is conveniently carried out in an aprotic solvent, containing not more than traces of water. Suitable solvents include: ethers, such as diethylether, ethylene glycol dimethyl ether, diethylene glycol dimethylether, tetrahydrofurane, dioxane diethyl carbitol; ketones, such as acetone, methyl-ethyl ketone, methylisobutyl ketone; esters such as ethyl acetate, methyl cellosolve acetate; amides, such as dimethyl formamide, dimethyl acetamide, N-methyl pyrrolidone; hydrocarbons, such as toluene; chlorinated hydrocarbon, such as tetrachloroethylene, trichloroethylene and 1,1,1-trichloroethane; sulfolane; and dimethylsulfoxide. Also useful are solvent mixtures. If the final product is to be an aqueous emulsion or solution, the chosen solvent is preferably at least partially water-soluble.

The reaction can be carried out in one step, by mixing the reactants, that is, the $R_f$-diol, the polysiloxane, the water-solubilizing diols or diamines, and the diisocyanate, in the appropriate ratios with the solvent and a small amount of catalyst to speed up the reaction, and stirring the reaction mixture at 25 to 100° C until isocyanate analysis shows reaction to be complete and no free —NCO groups are detectable by infrared analysis. The ratio of active hydrogen containing groups (—OH, —NH$_2$, —SH) to isocyanate groups can range from 1:2 to 1.2:1. It is, of course, within the scope of this invention to direct the reaction so that either hydroxy, amino, or isocyanate end groups result which in turn can be reacted with chain extenders, as is well known in polyurethane chemistry. When excess isocyanate is used to give isocyanate end groups, such chain extenders are compounds with about two to four active hydrogens. No more than two active hydrogens may be attached to a single atom. Groups that contain active hydrogens include —OH, =NH, —NH$_2$, —CO$_2$H, —CO$_2$NH$_2$, —SO$_2$NH$_2$ and —SH. Typical chain extending agents are therefore water, hydrogen sulfide, ethylene glycol, ethylenediamine, 1,2-ethanedithiol, triethanolamine, 2,4-toluenediamine, and adipic acid. Diamines are preferred. The chain extending agents are used to increase the molecular weight of an isocyanate-containing polyurethane by coupling it with at least one other polyurethane chain. Usually at least 0.5 mole is used per mole of the isocyanate-containing polyurethane.

The resulting higher molecular weight polyurethane may still contain unreacted isocyanate groups which may be reacted with an isocyanate blocking agent or a cross-linking agent. It is also possible to react an amino terminated polymer with 2 moles of a tri-isocyanate, the resulting tetraisocyanate prepolymer can be treated as described.

Excess isocyanate groups can be blocked by reaction with certain blocking agents which will split off on heating, for instance during curing, and free the isocyanate group for cross-linking reaction. The isocyanate blocking agent may be any one of those normally used to block isocyanates in urethane technology, for example: aryl alcohols, such as phenol, cresol, o- and p-nitrophenol, o- and p-chlorophenol, naphthol, 4-hydroxybiphenyl; oximes such as acetone oxime, butanone oxime; aryl mercaptans such as thiophenol; other organic active hydrogen compounds such as diethyl malonate, acetylacetone, ethyl acetoacetate, ethyl cyanoacetate, and e-caprolactam; and inorganic compounds such as sodium disulfite and hydroxylamine.

Isocyanate-terminated prepolymer resulting from the use of excess isocyanate can also be reacted with ammonia to give urea end groups, which in turn can be methylolated either before or during the curing reaction, when formaldehyde is set free from methylolated cross-linking resins.

Hydroxy- or amino-terminated prepolymers can be further reacted with cyclic anhydrides and thus give carboxy terminated polymers; suitable anhydrides are: maleic, succinic, phthalic, norbonane anhydrides; alkyl succinic anhydride; methyl norbonane anhydride; 2,2,4,4-benzophenone-tetracarboxylic acid dianhydride; tetrahydrofurane tetracarboxylic acid dianhydride; pyromellitic acid anhydride; benzene-tetracarboxylic acid dianhydride.

The polycondensation is preferably carried out in the presence of a catalyst. Preferred catalysts include tertiary amines (such as pyridine or triethylamine) and organo-tin catalysts (such as di-butyltin-dilaurate). Mixtures of tertiary amine and organo-tin catalysts are also useful The polycondensation can also be carried out in two or more separate steps, with the fluorinated block (I) being synthesized first, followed by chain extensions with the siloxane containing block (II) and optionally the hydrophilic block (III).

TREATMENT AND TESTING

The AATCC water spray test rating was determined according to Standard Test Method 22-1966 of the American Association of Textile Chemists and Colorists, XXXVII, 1961, 1952 (also designated ASTM-D-583-58). Ratings are given from 0 (minimum) to 100 (maximum).

The AATCC Oil Rating was determined according to Standard Test Method kk8-1966T of the American Association of Textile Chemists and Colorists. Ratings are given from 0 (minimum) to 8 (maximum). A commonly accepted level on soil repellent fabrics in the U.S. is an oil repellency of 4.

The home washes were carried out in a Kenmore washing machine, Model 600, at 120° F, employing 45 g. of the detergent "Tide XK" per washload.

All mentioned AATCC Tests are listed in the Technical Manual of the American Association of Textile Chemists and Colorists, Volume 46, edition 1970.

The novel polymers were applied to cotton fabric or polyester-cotton twill (65/35) in such a way that 0.04, 0.08 and 0.12% fluorine were deposited onto the fabric.

Polymers dissolved in a non-aqueous medium were applied to cotton by a padding process and were evaluated after air drying and after curing in a hot air oven at 150° C for 3 minutes.

Polymers prepared in water or a water-solvent mixture were applied to polyester-cotton twill by padding from an aqueous pad bath containing also the following permanent press resin catalyst and additives (so-called standard permanent press recipe):

4 grams/liter acetic acid (50%)
20 grams/liter isopropanol
240 grams/liter dimethylol dihydroxyethylene urea
40 grams/liter zinc nitrate catalyst
0.16% F/liter fluorochemical
pH adjusted to 4.5 with acetic acid — wet pick-up 50%

After the padding, the fabric is dried at 100° C for 2 minutes and cured at 163° C for 5 minutes.

The following Examples and Tables exemplify synthesis and compositions characteristic for the novel polymers.

In these Examples —R$_f$ denotes a linear perfluoroalkyl group of 6 to 12 carbon atoms with the following chain length distribution:

C$_6$F$_{13}$ — 35%
C$_8$F$_{17}$ — 37%
C$_{10}$F$_{27}$ — 23%
C$_{12}$F$_{23}$ — 5%

(R$_f$)$_2$-diol denotes a diol of the structure:

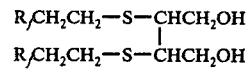

EXAMPLE 1

30 g. 2,3-di-perfluoroalkyl ethyl thiol butane-1,4-diol (0.03 mol) were dissolved in 35 g. methylethylketone and charged into a 3-neck flask equipped with condenser, stirrer, heater and nitrogen inlet tube to maintain a nitrogen atmosphere throughout the reaction sequence. 4.4 g. 2,2,3-trimethyl hexane-1,6-diisocyanate (TMDI) (0.02 mole) were added, followed by 0.05 g. triethylamine and 0.05 g. dibutyltin dilaurate. The solution was stirred at reflux for 4 hours, after which time no —NCO was detectable by infrared analysis. 8.8 g. (0.04 mol) TMDI were added, followed by 60 g. (0.01 mol) of the siloxane triol 1248 fluid:

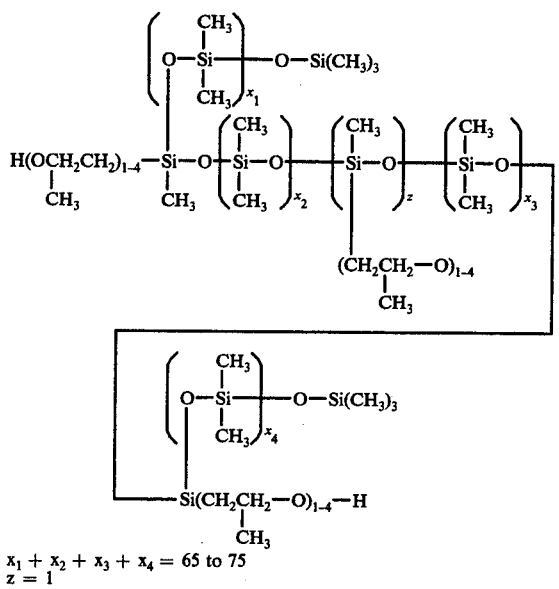

$x_1 + x_2 + x_3 + x_4 = 65 \text{ to } 75$
$z = 1$ and 2.4 g. (0.20 mol) N-methyl diethanol amine, dissolved in 70 g. methylethylketone. The solution was stirred at reflux for 4 hours, after which time infrared analysis showed little or no unreacted —NCO groups left. The solution was cooled to 30° C. 20 g. acetic acid were added, and under vigorous stirring 75 g. water were slowly added in a thin stream. A yellowish, semi-opaque viscous emulsion was obtained with a solid content of 35%, which was readily soluble with water.

EXAMPLE 2

30 g. ($R_f)_2$-diol (0.03 mol) were dissolved in 35 g. MEK and charged into a 3-neck flask equipped with condenser, stirrer, thermoregulator and nitrogen inlet tube. 4.2 g. TMDI (0.02 mol) were added, followed by 0.05 g. triethylamine and 0.05 g dibutyltin dilaurate. The solution was stirred at reflux for 4 hours; then 14.7 g. TMDI (0.07 mol) were added followed by 32 g. (0.04 mol) of a siloxane triol of Q4-3557:

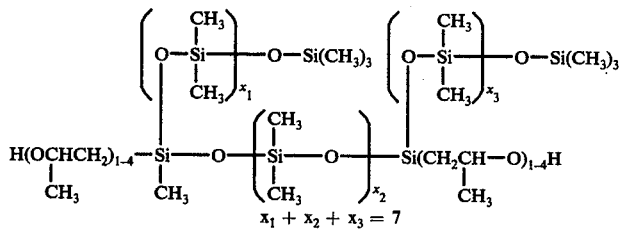

$x_1 + x_2 + x_3 = 7$ and 2.38 g. (0.02 mol) N-methyldiethanolamine, dissolved in 50 g. MEK. The solution was stirred at reflux for 4 hours, after which time IR-analysis showed only traces of —NCO left unreacted. The solution was cooled to 30° C, 15 g. acetic acid added and 75 g. water were slowly added in a thin stream to the stirred solution. A brown, clear solution was obtained with a solids content of 32% which could be further diluted with water.

EXAMPLE 3

Example 2 was repeated, but the TMDI was substituted with an equimolar amount diphenylmethane-4,4′-diisocyanate, and NMDA was substituted with methyl-di-3-amino propylamine ($H_3C$—N—$(CH_2CH_2CH_2NH_2)_2$). A light yellow solution of 32.5% solids was obtained, which could be further diluted with water.

EXAMPLE 4

30 g. ($R_f)_2$-diol (0.03 mol) were dissolved in 35 g. methylethylketone and charged into a 3-neck flask equipped with condenser, stirrer, thermoregulator and nitrogen inlet tube. 4.4 g. TMDI (0.02 moles) were added, followed by 0.05 g. triethylamine and 0.05 g. dibutyltin dilaurate. The solution is stirred at reflux for 4 hours, after which time no —NCO was detectable by infrared analysis. Then 8.8 g. (0.04 mol) TMDI were added, followed by 21.3 g. (0.01 mol) of a siloxane diol Q4-3667:

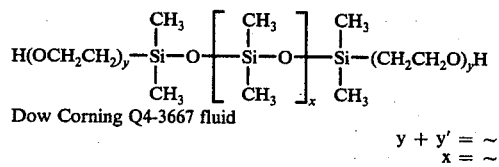

Dow Corning Q4-3667 fluid $y + y' = \sim 26$
$x = \sim 10$ and 2.38 g. N-methyldiethanolamine (NMDA) (0.02 moles), dissolved in 35 g. methylethylketone. The solution was stirred for 4 hours at reflux, after which time no unreacted —NCO was detectable by IR. The solution was cooled to 30° C and 5 g. acetic acid were added, followed by 100 g. water. A clear, viscous solution was obtained with a solids content of 27%, which was readily dilutable with water.

EXAMPLES 5 – 9

Following the procedures of Example 2, polyurethanes were prepared as 50% solution in MEK with the molar amounts of ($R_f)_2$-diol, TMDI, polysiloxane Q4 3557 and NMDA given below. All but Example 8, which does not contain NMDA, were converted into aqueous emulsions as described in Example 2.

| Ex. No. | 1 Step ($R_f)_2$-Diol (A) | | TMDI (B) | | 2 Step TMDI (B) | | Q4-3557(C) | | NMDA (D) | | Molar Composition 1) A B C D | % F | % Siloxane |
|---|---|---|---|---|---|---|---|---|---|---|---|---|---|
| | g | mol | g | mol | g | mol | g | mol | g | mol | | | |
| 5 | 15 | 0.015 | 2.1 | 0.01 | 17.8 | 0.085 | 32 | 0.04 | 4.76 | 0.04 | 3-19-8-8 | 13 | 44 |
| 6 | 15 | 0.015 | 2.1 | 0.01 | 17.8 | 0.085 | 48 | 0.06 | 2.38 | 0.02 | 3-19-12-4 | 11 | 55 |
| 7 | 6.6 | 0.006 | 0.84 | 0.004 | 13.9 | 0.066 | 38.4 | 0.048 | 1.90 | 0.016 | 3-35-24-8 | 6.2 | 62 |
| 8 | 13.3 | 0.012 | 1.68 | 0.008 | 14.3 | 0.068 | 51 | 0.064 | — | — | 3-19-16-0 | 9.3 | 64 |
| 9 | 15 | 0.015 | 2.1 | 0.01 | 17.8 | 0.085 | 40 | 0.05 | 3.57 | 0.03 | 3-19-10-6 | 12 | 50 |

EXAMPLES 5 – 9-continued

Following the procedures of Example 2, polyurethanes were prepared as 50% solution in MEK with the molar amounts of (R$_f$)$_2$-diol, TMDI, polysiloxane Q4 3557 and NMDA given below. All but Example 8, which does not contain NMDA, were converted into aqueous emulsions as described in Example 2.

| Ex. No. | 1 Step (R$_f$)$_2$-Diol (A) | | TMDI (B) | | 2 Step TMDI (B) | | Q4-3557(C) | | NMDA (D) | | Molar Composition 1) A B C D | % F | % Siloxane |
|---|---|---|---|---|---|---|---|---|---|---|---|---|---|
|  | g | mol | g | mol | g | mol | g | mol | g | mol |  |  |  |
| 2 | 30 | 0.03 | 4.2 | 0.02 | 14.7 | 0.07 | 32 | 0.04 | 2.38 | 0.02 | 3 9- 4-2 | 21.3 | 38 |

(A) = (R$_f$)$_2$-diol
(B) = TMDI (trimethylhexane-1,6-diisocyanate)
(C) = Polysiloxane Q4-3557
(D) = NMDA (N-methyldiethanolamine)

EXAMPLE 10

15.6 g (R$_f$)$_2$-diol (0.015 mol) were dissolved in 18 g. methylethylketone and charged into a 3-neck flask equipped with condenser, stirrer, thermoregulator and nitrogen inlet tube. 2.1 g. TMDI (0.01 mole) were added, followed by 0.0189 g. dibutyltindilaurate. The solution is stirred at reflux for 4 hours, after which time no —NCO was detectable by infrared analysis. Then 6 g. dimeraciddiisocyanate (DDI) (0.01 mol) were added, followed after one hour at reflux by 15.0 g. (0.005 mol) were added, followed after one hour at reflux by 15.0 g. (0.005 mol) of a siloxane dithiol X2-8024:

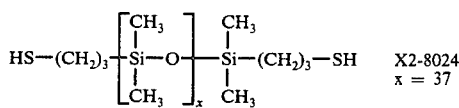

$$HS-(CH_2)_3-\begin{bmatrix}CH_3\\|\\Si-O\\|\\CH_3\end{bmatrix}_x -\begin{matrix}CH_3\\|\\Si-(CH_2)_3-SH\\|\\CH_3\end{matrix} \quad X2\text{-}8024 \quad x=37$$

2.1 g. (0.01 mol) TMDI and 1.19 g. N-methyl diethanolamine (NMDA) (0.01 mol) dissolved in 24 g. methylethylketone. The solution was stirred for 4 hours at reflux, after which time no unreacted —NCO was detectable by IR. The solution was cooled to 30° C and 5 g. acetic acid were added, followed by 50 g. water. A clear, viscous solution was obtained containing 22% solids and easily dilutable with water.

EXAMPLE 11

15. g (R$_f$)$_2$-diol (0.015 mol) were dissolved in 18 g. methylethylketone and charged into a 3-neck flask equipped with condenser, stirrer, thermoregulator and nitrogen inlet tube. 2.1 g. TMDI (0.01 mole) were added, followed by 0.018 g. dibutyltindilaurate. The solution is stirred at reflux for 4 hours, after which time no —NCO was detectable by infrared analysis. Then 6 g. (0.01 mol) DDI were added, followed after 1 hour at reflux by 30.0 g. (0.01 mol) of a siloxane dithiol X2-8024:

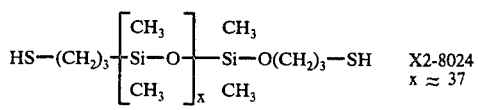

$$HS-(CH_2)_3-\begin{bmatrix}CH_3\\|\\Si-O\\|\\CH_3\end{bmatrix}_x -\begin{matrix}CH_3\\|\\Si-O(CH_2)_3-SH\\|\\CH_3\end{matrix} \quad X2\text{-}8024 \quad x \approx 37$$

and 1.05 g. (0.005 mol) TMDI dissolved in 31 g. methylethylketone. 0.03 g. triethylamine were added. The solution was stirred for 4 hours at reflux, after which time no unreacted —NCO was detectable by IR. The solution was cooled to room temperature and had a solids content of 33%.

EXAMPLE 12

The R$_f$-polysiloxane emulsions of Examples 1 to 10 (except Example 8), were applied to polyester/cotton (P/C) and nylon (N) fabric according to the procedure given above in Treatment and Testing Section.

EXAMPLE 12

The R$_f$-polysiloxane emulsions of Examples 1 to 10 (except Example 8), were applied to polyester/cotton (P/C) and nylon (N) fabric according to the procedure given above in Treatment and Testing Section.

| | Add-On on Fabric | | Repellency: AATCC | | | |
|---|---|---|---|---|---|---|
| | | | P/C | | Nylon | |
| Ex. No. | % F | % Silicone | Oil | H$_2$O | Oil | H$_2$O |
| 1 | 0.08 | 0.32 | 3 | 70 | 6 | 80 |
| 2 | 0.08 | 0.14 | 5 | 70 | 6 | 70 |
| 3 | 0.08 | 0.14 | 2 | 90 | 4 | 100 |
| 4 | 0.08 | 0.09 | 5 | 50 | 5 | 0 |
| 5 | 0.06 | 0.20 | 3 | 70 | 5 | 70 |
| 6 | 0.06 | 0.30 | 3 | 70 | 6 | 70 |
| 7 | 0.06 | 0.60 | 5 | 70 | 5 | 50 |
| 9 | 0.06 | 0.25 | 3 | 70 | 6 | 70 |
| 10 | 0.08 | 0.13 | 2 | 100 | — | — |

EXAMPLE 13

The R$_f$-polysiloxane polyurethane solutions of Example 8 and Example 11 were applied to fabrics from dilute 1,1,1-trichloroethane solutions, as described above under "Treatments and Testing".

EXAMPLE 13

The R$_f$-polysiloxane polyurethane solutions of Example 8 and Example 11 were applied to fabrics from dilute 1,1,1-trichloroethane solutions, as described above under "Treatments and Testing".

| | Add-On on Fabric | | Repellency: AATCC | | | |
|---|---|---|---|---|---|---|
| | | | P/C | | Nylon | |
| Ex. No. | % F | % Silicone | Oil | H$_2$O | Oil | H$_2$O |
| 8 | 0.06 | 0.40 | 4 | 70 | 4 | 70 |
| 11 | 0.08 | 0.26 | 3 | 80 | — | — |

I claim:

1. A polyurethane comprising 5 to 60% of a perfluoroalkyl-containing segment and 40–95% of a siloxane-containing segment, wherein the perfluoroalkyl-containing segment is selected from those of the structure:

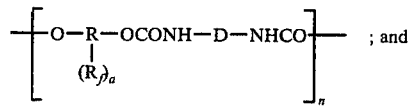

$$-\left[O-\underset{(R_f)_a}{R}-OCONH-D-NHCO\right]_n- \quad ;\text{ and}$$

the siloxane-containing segment is selected from those of the structures

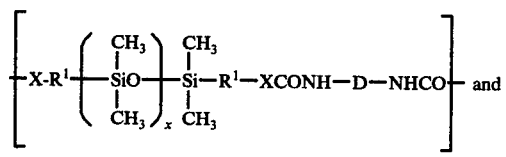

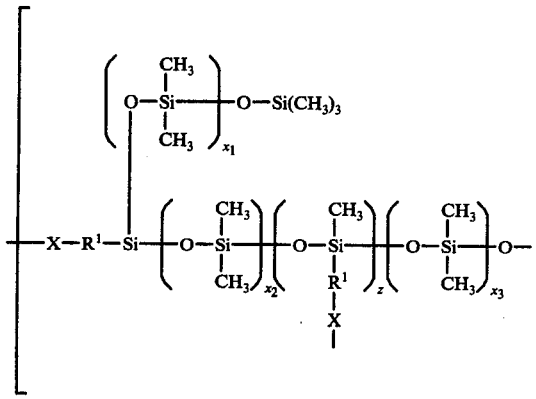

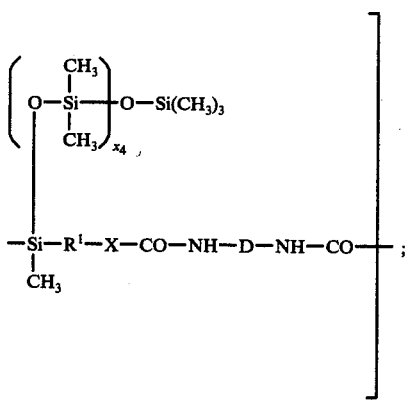

wherein

D is lower alkylene, cycloalkylene, phenylene or naphthylene,

R is a branched or straight chain bridging group selected from alkylene of 1 to 12 carbon atoms, alkylene thioalkylene of 2 to 12 carbon atoms, alkylene polyoxyalkylene of 4 to 80 carbon atoms and 1 to 40 oxygen atoms, alkyleneiminoalkylene of 1 to 12 carbon atoms where the nitrogen atom contains as a third substituent hydrogen or an alkyl or hydroxy-alkyl group of 1 to 6 carbon atoms, $R_f$ is perfluoroalkyl of 4 to 18 carbon atoms or a perfluoroalkoxyperfluoroalkyl of 4 to 24 carbon atoms, X is oxygen or sulfur or NH, n is 1 to 5, a is 1 or 2, $x_1$, $x_2$, $x_3$ and $x_4$ are independently of each other 1 to 40 with $x_1 + x_2 + x_3 + x_4 = 5$ to 75, z is 0 or 1, $R^1$ is alkylene of 3 to 5 carbon atoms or a polyalkoxy chain of 1 to 15 alkoxy units of 2 or 3 carbon atoms each, and x is 5 to 50.

2. The polyurethane of claim 1, wherein $R_f$ is perfluoroalkyl of 6 to 12 carbon atoms.

3. The polyurethane of claim 2, wherein the perfluoroalkyl-segment is prepared from a diol of the structure:

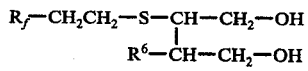

wherein $R^6$ is H- or $R_f$—CH$_2$—CH$_2$—S—.

4. The polyurethane of claim 1, wherein the siloxane-containing segment is prepared from a siloxane selected from the group consisting of:

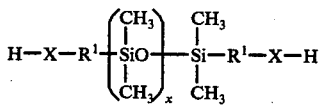

where $R^1$ is an alkyl group of 3 to 5 carbon atoms or a polyalkoxy chain with 1 to 15 lower alkoxy units, x is 5 to 75 and X is —O— or —S—.

5. The polyurethane of claim 4, wherein the siloxane is of the structure where $R^1$ is a polyethoxy chain of an average 13 ethoxy units, x is 10, and X is —O—, or is of the structure where $R^1$ is —(CH$_2$)$_3$—, and x is about 37.

6. The polyurethane of claim 1, wherein the siloxane-containing segment is prepared from a siloxane selected from the group consisting of:

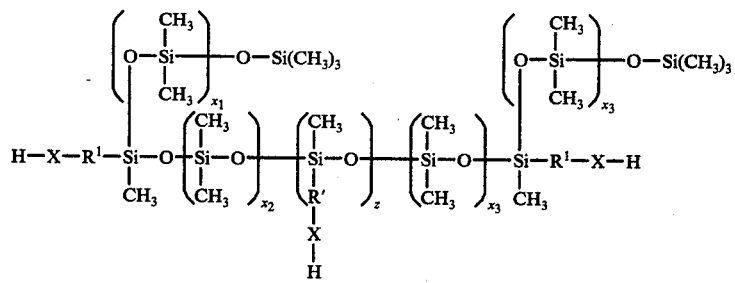

wherein $R^1$ is a polyalkoxy chain of 1 to 15 lower alkoxy units, $x_1 + x_2 + x_3 + x_4 = 5$ to 75 and z is 0 or 1.

7. The polyurethane of claim 6, wherein the siloxane is of the structure where $x_1 + x_2 + x_3 + x_4 = 65$ to 75 and z is 1, or is of the structure where $x_1 + x_2 + x_3 + x_4 = 6$ to 8 and z is 0 or 1.

8. The polyurethane of claim 7, wherein the siloxane is of the structure where $R^1$ is

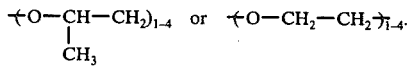 or 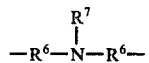

9. The polyurethane of claim 1, wherein the siloxane-containing segment is prepared from a siloxane selected from the group consisting of:

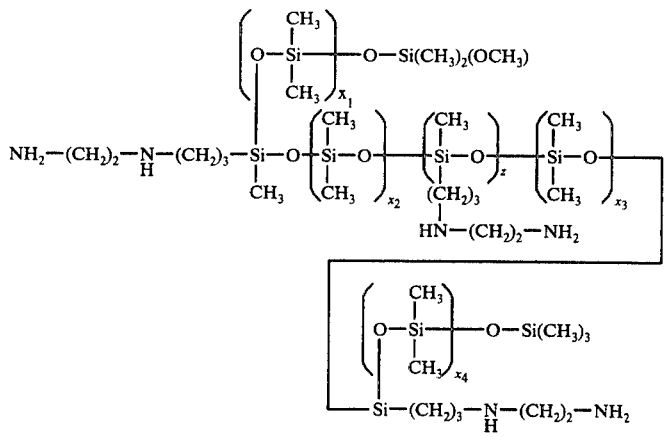

wherein $x_1 + x_2 + x_3 + x_4 = 10$ to 100 and $z$ is 0 or 1.

10. The polyurethane of claim 1, further comprising up to 50% of a hydrophilic segment of the structure

wherein
X' is oxygen or NH,
$R^2$ is a diradical moiety of either a tertiary-amino-group-containing diol or diamine, or of a polyalkylene-oxide-containing diol or diamine, or of a carboxy-substituted diol or diamine,
X is oxygen or sulfur or NH, and
D is lower alkylene, cycloalkylene, phenylene or naphthylene.

11. The polyurethane of claim 10, wherein 10 to 50% of the hydrophilic segment is present and wherein the hydrophilic segment is of the structure where X and X' are oxygen, and $R_2$ is —$CH_2CH_2O)_{3-44}CH_2CH_2$— or X is oxygen, X' is NH and $R_2$ is

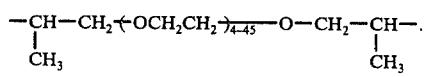

12. The polyurethane of claim 10, wherein up to 10% of the hydrophilic segment is present and the hydrophilic segment is of the structure where X and X' are oxygen or NH and $R_2$ is a tertiary-amine-containing lower-alkylene group.

13. The polyurethane of claim 12, wherein $R_2$ is of the structure $$-R^6-N(R^7)-R^6-$$

where $R^6$ is lower alkylene and $R^7$ is lower alkyl or phenyl, or one of $R^6$ and $R^7$ together complete a piperidine or a piperazine ring.

14. The polyurethane of claim 12, wherein the tertiary amino group is pyridyl.

15. The polyurethane of claim 1, wherein D is selected from the group consisting of alkylene of 2 to 9 carbon atoms, 4,4'-diphenylmethane, 1,3-benzene, 1,4-benzene, and cyclohexylene.

16. The polyurethane of claim 15, wherein the cyclohexylene is derived from Dimer Acid or is of the structure

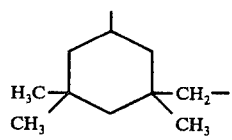

17. The polyurethane of claim 10, wherein the polyurethane comprises about 20 to 40% of the perfluoroalkyl segment prepared from a diol of the structure

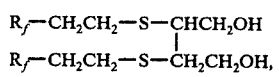

where $R_f$ is perfluoroalkyl of 6 to 12 carbon atoms; and 50 to 70% of the siloxane-containing segment prepared from a siloxane of the structure

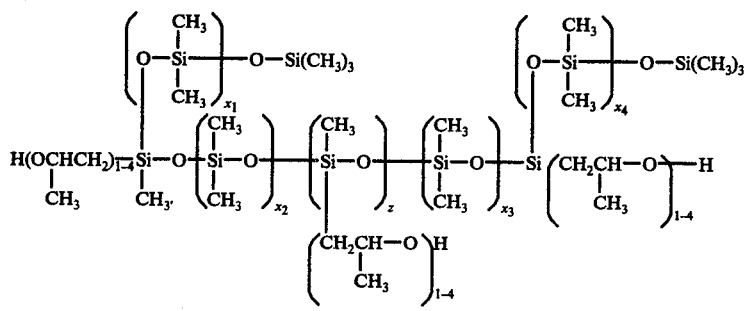

where
$x_1 + x_2 + x_3 + x_4 = 65$ to 75 and $z$ is 1, or
$x_1 + x_2 + x_3 + x_4 = 6$ to 8 and $z$ is 0; and about
1 to 10% of a hydrophilic segment of the structure

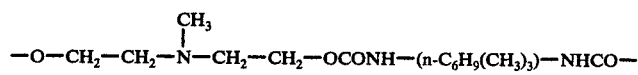

and wherein the perfluoroalkyl segment and siloxane segment are prepared by reaction with 2,2,4-(or 2,4,4-)-trimethyl-1,6-hexylene diisocyanate.

18. An aqueous dispersion containing a polyurethane of claim 1.
19. An aqueous dispersion containing a polyurethane of claim 10.
20. Textile material treated with a polyurethane of claim 1.
21. Textile material treated with the polyurethane of claim 17.

* * * * *

UNITED STATES PATENT AND TRADEMARK OFFICE
CERTIFICATE OF CORRECTION

PATENT NO. : 4,098,742
DATED : JULY 4, 1978
INVENTOR(S) : KARL FRIEDRICH MUELLER

It is certified that error appears in the above-identified patent and that said Letters Patent are hereby corrected as shown below:

In claim 6, column 18, line 48, "$x_3$" should read -- $x_4$ --.

Signed and Sealed this

Eleventh Day of March 1980

[SEAL]

Attest:

Attesting Officer

SIDNEY A. DIAMOND

Commissioner of Patents and Trademarks